United States Patent
Cao

(10) Patent No.: US 11,217,219 B2
(45) Date of Patent: Jan. 4, 2022

(54) METHOD FOR PREPARING SOUND-ABSORBING ARTICLE, AND SOUND-ABSORBING ARTICLE

(71) Applicant: GOERTEK INC., Weifang (CN)

(72) Inventor: Xiaodong Cao, Weifang (CN)

(73) Assignee: GOERTEK INC., Weifang (CN)

( * ) Notice: Subject to any disclaimer, the term of this patent is extended or adjusted under 35 U.S.C. 154(b) by 642 days.

(21) Appl. No.: 16/078,222

(22) PCT Filed: May 18, 2016

(86) PCT No.: PCT/CN2016/082466
§ 371 (c)(1),
(2) Date: Aug. 21, 2018

(87) PCT Pub. No.: WO2017/148011
PCT Pub. Date: Sep. 8, 2017

(65) Prior Publication Data
US 2019/0139527 A1  May 9, 2019

(30) Foreign Application Priority Data
Feb. 29, 2016  (CN) .......................... 201610112317.3

(51) Int. Cl.
*G10K 11/165* (2006.01)
*C08K 3/36* (2006.01)
(Continued)

(52) U.S. Cl.
CPC ............ *G10K 11/165* (2013.01); *C08G 18/06* (2013.01); *C08J 9/122* (2013.01); *C08K 3/34* (2013.01);
(Continued)

(58) Field of Classification Search
CPC .... G10K 11/002; G10K 11/165; C08G 18/06; C08G 2101/00; C08G 2350/00; C08J 9/122; C08K 3/34; C08K 3/36
See application file for complete search history.

(56) References Cited

U.S. PATENT DOCUMENTS 4,383,049 A * 5/1983 Blount ............... C08G 63/6958
521/135
9,691,371 B1 * 6/2017 Lin ....................... G10K 11/165
(Continued)

FOREIGN PATENT DOCUMENTS

CN  102015580 A  4/2011
CN  103237838 A *  8/2013 ............... C08J 9/35
(Continued)

*Primary Examiner* — Jeremy A Luks
(74) *Attorney, Agent, or Firm* — Saliwanchik, Lloyd & Eisenschenk

(57) ABSTRACT

Disclosed are a method for preparing a sound-absorbing member and a sound-absorbing member. The method for preparing a sound-absorbing member includes: providing non-foaming sound-absorbing material powder and a foaming material; uniformly mixing the non-foaming sound-absorbing material powder with the foaming material and adding an auxiliary to form a sound-absorbing mixture; and foaming the sound-absorbing mixture to form foam with cells, wherein the non-foaming sound-absorbing material powder adheres to a surface and the cells of the foam. The foamed sound-absorbing material powder and the foam constitute a sound-absorbing member.

5 Claims, 1 Drawing Sheet

---

Providing non-foaming sound-absorbing material powder and a foaming material

↓

Uniformly mixing the non-foaming sound-absorbing material powder with the foaming material and adding an auxiliary to form a sound-absorbing mixture

↓

Foaming the sound-absorbing mixture to form foam with cells, wherein the non-foaming sound-absorbing material powder adheres to a surface and the cells of the foam

(51) Int. Cl.
    *C08G 18/06*      (2006.01)
    *C08K 3/34*       (2006.01)
    *C08J 9/12*       (2006.01)
    *G10K 11/00*      (2006.01)
    *C08G 101/00*     (2006.01)

(52) U.S. Cl.
    CPC ............. *C08K 3/36* (2013.01); *G10K 11/002* (2013.01); *C08G 2101/00* (2013.01); *C08G 2350/00* (2013.01)

(56) References Cited

U.S. PATENT DOCUMENTS

| | | | |
|---|---|---|---|
| 10,759,891 B2 * | 9/2020 | Van der Wal | C08G 18/409 |
| 2014/0066536 A1 * | 3/2014 | Adkins | C08G 18/632 |
| | | | 521/163 |
| 2016/0333160 A1 * | 11/2016 | Bertucelli | C08G 18/163 |

FOREIGN PATENT DOCUMENTS

| | | |
|---|---|---|
| CN | 104031284 A | 9/2014 |
| KR | 20130087836 A | 8/2013 |

\* cited by examiner

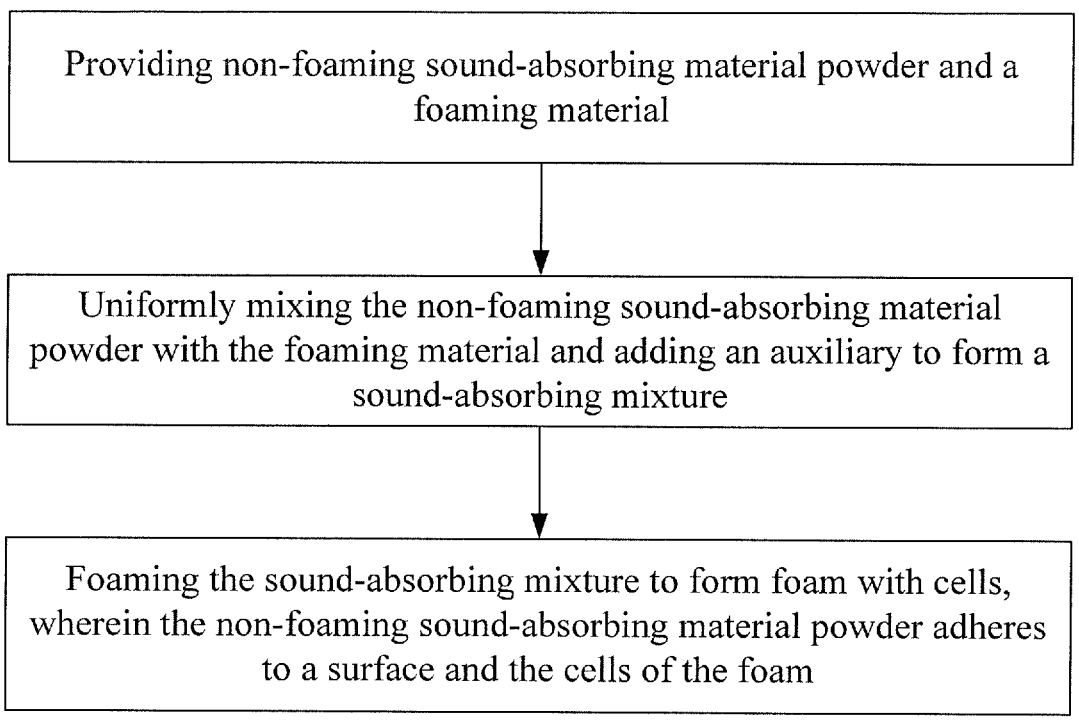

METHOD FOR PREPARING SOUND-ABSORBING ARTICLE, AND SOUND-ABSORBING ARTICLE

CROSS REFERENCE TO RELATED APPLICATIONS

This invention is a National Stage of International Invention No. PCT/CN2016/082466, filed on May 18, 2016, which claims priority to Chinese Patent Invention No. 201610112317.3, filed on Feb. 29, 2016, both of which are hereby incorporated by reference in their entireties.

TECHNICAL FIELD

The present invention belongs to the technical field of material processing, and in particular relates to a method for preparing a sound-absorbing member and a sound-absorbing member.

BACKGROUND

At present, the requirements for the sound quality of micro-speakers are getting higher and higher, and sound-absorbing materials need to be added inside the micro-speakers to improve sound effects. At present, the commonly used sound-absorbing materials include foaming foam and non-foaming sound-absorbing materials. The non-foaming sound-absorbing materials have better performance in terms of acoustic performance than the foaming foam. The non-foaming sound-absorbing materials are usually in the form of powder and made into granules for use by those skilled in the art.

Existing processing techniques such as oil column forming and boiling granulation can prepare powdered sound-absorbing materials into a granular structure. Those skilled in the art can add a binder during processing to promote powder granulation. However, the binder will affect the sound-absorbing effect of the non-foaming sound-absorbing material, so the proportion of the binder should not be too high. On the other hand, if the amount of the binder is too low, the strength of the resulting granules is low, edges and corners tend to appear, and the granules have low sphericity. This situation will result in reduction of the drop resistance and abrasion resistance of the sound-absorbing material granules. The granules tend to suffer from powdering and even breakage when they work in the speaker for a long time. Further, the sound-absorbing material granules made by the existing forming process also have defects in acoustic performance. The sound-absorbing material granules prepared by the boiling granulation method, the disc rolling into ball method and the like have high density, a small specific surface area, and poor ventilation performance. The surface and internal properties of the sound-absorbing material granules made by using the oil column forming method are not uniform.

Therefore, the inventors of the present invention believe that it is necessary to improve the preparation method of the sound-absorbing material granules so as to improve the performance of the sound-absorbing material granules.

SUMMARY

It is an object of the present invention to provide a new technical solution for preparing sound-absorbing members.

According to a first aspect of the present invention, there is provided a method for preparing a sound-absorbing member, the method comprising: providing non-foaming sound-absorbing material powder and a foaming material; uniformly mixing the non-foaming sound-absorbing material powder with the foaming material and adding an auxiliary to form a sound-absorbing mixture; and foaming the sound-absorbing mixture so that the foaming material forms foam with cells, wherein the non-foaming sound-absorbing material powder adheres to a surface and the cells of the foam, and the non-foaming sound-absorbing material powder and the foam constitute a sound-absorbing member.

Optionally, the foaming material is polyol, and the foaming process is continuous application of high-pressure carbon dioxide gas to the sound-absorbing mixture, and the formed foam is polyurethane foam.

Optionally, the non-foaming sound-absorbing material powder is molecular sieves, and the auxiliary comprises a humectant and a binder.

Optionally, the binder is inorganic silica sol, and the mass ratio of the binder in the sound-absorbing mixture is 3%-3.5%.

Optionally, the foaming material is mixed powder of melamine and formaldehyde resin, the foaming process is effected by microwaves on the sound-absorbing mixture, and the formed foam is melamine foam.

Preferably, the non-foaming sound-absorbing material powder is at least one of molecular sieves, natural zeolite powder and silica, and the auxiliary includes a humectant and a defoamer.

Optionally, the mass ratio of the auxiliary in the sound-absorbing mixture is 0.02%-20%.

Optionally, the preparation method further includes cutting and compressing the foam so that the size of the sound-absorbing member matches a predetermined size.

The present invention also provides a sound-absorbing member, comprising foam, wherein cells are arranged in the foam, non-foaming sound-absorbing material powder is attached to the cells and a surface of the foam, and the sound-absorbing material powder is at least one of molecular sieves, natural zeolite powder and silica.

Optionally, the foam is polyurethane foam, and the mass ratio of the non-foaming sound-absorbing material powder in the sound-absorbing member is 25%-65%; or, the foam is melamine foam, and the mass ratio of the non-foaming sound-absorbing material powder in the sound-absorbing member is 15%-55%.

The inventors of the present invention have found that in the prior art, although there is a certain defect in the preparation method of the sound-absorbing material granules, the sound-absorbing material granules prepared by these preparation methods also have good performance in different aspects. For example, the sound-absorbing material granules prepared by a preparation method have better sound-absorbing effects, while the sound-absorbing material granules produced by another preparation method have relatively better drop resistance and abrasion resistance. Therefore, those skilled in the art did not consider improving the preparation method of the sound-absorbing material granules, but rather select different preparation methods according to the desired properties of the sound-absorbing material granules. Therefore, the technical task to be achieved or the technical problem to be solved by the present invention is never thought or intended by those skilled in the art, and no technical solutions of combined use of foaming sound-absorbing materials and non-foaming sound-absorbing materials have appeared in the prior art. Therefore, the present invention is a new technical solution.

Further features of the present invention and its advantages will become apparent from the following detailed description of exemplary embodiments of the present invention with reference to the attached drawings.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 1 is a block diagram of steps of a method for preparing a sound-absorbing member according to the present invention.

DETAILED DESCRIPTION

Various exemplary embodiments of the present invention will now be described in detail with reference to the accompanying drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to be in any way limiting on the present invention, its application, or uses.

Techniques, methods, and devices known to one of ordinary skill in the relevant art may not be discussed in detail, but the techniques, methods and devices should be considered as part of the specification where appropriate.

In all examples shown and discussed herein, any specific value should be interpreted as illustrative only and not as a limitation. Therefore, other examples of the exemplary embodiments may have different values.

It should be noted that like reference numerals and letters refer to similar items in the following figures, and therefore, once an item is defined in one FIGURE, it need not be further discussed in subsequent figures.

The present invention provides a method for preparing a sound-absorbing material. The method combines a conventional foaming sound-absorbing material with a non-foaming sound-absorbing material. The prepared sound-absorbing member has good ventilation performance and uniform sound-absorbing effect. In addition, this type of sound-absorbing member has a good deformability, and will not suffer from breakage, powdering or the like when subjected to impact or long-term use. In the preparation method according to the present invention, first, non-foaming sound-absorbing material powder and a foaming material are provided. The non-foaming sound-absorbing material powder is usually aluminosilicate powder or other powder capable of providing a silicon source and an aluminum source. In the present invention, the non-foaming sound-absorbing material powder is preferably natural zeolite powder, molecular sieves, and silica. Materials such as white carbon black, activated carbon, or the like may also be used as the non-foaming sound-absorbing material powder. The present invention does not limit the specific material of the non-foaming sound-absorbing material powder. Those skilled in the art can select the material that can provide the silicon source and the aluminum source according to actual conditions. The foaming material may be selected according to the performance requirements of the resulting sound-absorbing member. In the present invention, the foaming material may be polyol powder or mixed powder of melamine and formaldehyde resin. Different types of foaming materials ultimately produce different types of foam. The present invention is not limited to the use of the above two types of foaming materials. Those skilled in the art can select the types of foaming materials according to the type of foam generated by actual needs. Secondly, the non-foaming sound-absorbing material powder and the foaming material provided are uniformly mixed and an auxiliary is added to the mixture to form a sound-absorbing mixture. The non-foaming sound-absorbing material powder needs to be uniformly mixed in the foaming material, so that the non-foaming sound-absorbing material powder can be evenly adhered to cells in the foam in the subsequent foaming process. The auxiliary assists the mixing of the foaming material and the non-foaming sound-absorbing material powder and the foaming process of the foaming material, and promotes the uniform adhesion of the non-foaming sound-absorbing material powder to the formed foam. Different non-foaming sound-absorbing material powder and foaming materials need different types of specific auxiliaries, so the present invention does not specifically limit the types of auxiliaries. Those skilled in the art can make a selection according to actual conditions. Third, the sound-absorbing mixture is foamed so that the foaming material therein forms foam having cells. Since the non-foaming sound-absorbing material powder is uniformly mixed with the foaming material, when the foaming material generates cells and gradually forms foam, the non-foaming sound-absorbing material powder adheres to the cells and surface of the foam. The foam and the non-foaming sound-absorbing material powder adhered thereto constitute a sound-absorbing member. Because the foam has a rich cell structure, on the one hand, the foam has good deformability, provides a flexible, shock-resistant base for the non-foaming sound-absorbing material powder, and improves the drop resistance of the sound-absorbing member, which solves the falling, breakage and powdering problems of the sound-absorbing member in the speaker. On the other hand, the cell structure provides a good ventilation space and an attachment skeleton, and the non-foaming sound-absorbing material powder can adhere to and cohere to the cell structure. The non-foaming sound-absorbing material powder has a microporous structure in the crystal structure, the microporous structure can provide a good sound-absorbing effect, and the cells provide good ventilation. Therefore, the sound-absorbing member produced by the method according to the present invention has good acoustic performance and can meet the sound-absorbing requirements in speaker products. Further, the preparation method according to the present invention has a simple process and effectively reduces the cost of labor and equipment. Moreover, the method can effectively improve the utilization rate of non-foaming sound-absorbing material powder, avoid material waste, and reduce the cost of processing raw materials.

In an embodiment of the present invention, the foaming material may be polyol DTI powder. For such a foaming material, the foaming process may include: placing the sound-absorbing mixture in a reactor and continuously applying high-pressure carbon dioxide gas to the polyol DTI powder in the device. The sustained action of the high-pressure carbon dioxide gas enables the polyol DTI foaming material to generate a self-foaming reaction, thereby forming polyurethane foam.

In another embodiment of the present invention, the foaming material may be mixed powder of melamine powder and formaldehyde resin powder. For such a foaming material, the foaming process may be acting on the sound-absorbing mixture through microwaves to cause the melamine powder to polymerize with the formaldehyde resin powder to form melamine foam.

The above two embodiments illustrate the foaming process of the two foaming materials that can be used in the present invention. In other embodiments of the present invention, other foaming materials may also be used, and accordingly, the foaming process adopted may also be different. Those skilled in the art can adjust the selection of the foaming material and the foaming process according to the actual processing conditions and the required properties of the sound-absorbing member.

Further, in the case where the foaming material is polyol DTI, molecular sieves are preferably used as the non-foaming sound-absorbing material powder. In order to uniformly mix the two and increase the affinity of the non-foaming sound-absorbing material powder with polyol, the auxiliaries doped into the sound-absorbing mixture may include a humectant and a binder. In order to play a good bonding effect without affecting the sound-absorbing performance of the sound-absorbing member by the binder, preferably, the mass ratio of the binder in the sound-absorbing mixture should be 3%-3.5%. Inorganic silica sol can be selected as the binder, and the inorganic silica sol has better bonding effect with the polyol DTI and the molecular sieves, so that the molecular sieves can be more reliably adhered to the cells of the polyurethane foam. The polyol DTI has a larger amount of cells and a larger cell diameter in the foaming process, so the mass ratio of the non-foaming sound-absorbing material powder in the sound-absorbing mixture can be appropriately increased.

In the case where the foaming material is mixed powder of melamine and formaldehyde resin, at least one of molecular sieves, natural zeolite powder, and silica is preferably used as the non-foaming sound-absorbing material powder. It is also possible to mix the above three materials as the non-foaming sound-absorbing material powder. The auxiliary may include a humectant and a defoamer. If the cell volume of the melamine foam to be produced is large, a small amount of binder may also be included in the auxiliary. If the cell volume in the melamine foam to be generated is small, no binder is required. The amount of cells generated by melamine and formaldehyde resin in the foaming process is smaller than the amount of cells generated by polyol DTI, and cell diameter is relatively small, so the mass ratio of the non-foaming sound-absorbing material powder in the sound-absorbing mixture can be properly reduced to avoid the situation that the cells provided by the melamine foam cannot accommodate all the non-foaming sound-absorbing material powder.

The auxiliary occupies a small part of the sound-absorbing mixture. Preferably, the auxiliary accounts for 0.02%-20% of the total mass of the sound-absorbing mixture. According to the types of the actually used non-foaming sound-absorbing material powder and foaming material, there may be no need to use auxiliaries or the amount used is very small, and the amount of the auxiliaries shall not exceed 20%.

The foaming step may be performed in a limited space or in a semi-open space. If the foaming process is performed in a semi-open space, the size of the foamed sound-absorbing member is large. Depending on the foaming conditions, the size of the sound-absorbing member may differ greatly from a predetermined size. Therefore, after the foaming process is completed, preferably, a cutting and/or compression treatment may also be included. For example, the shape of the sound-absorbing member may be cut to match the predetermined shape of a rear cavity of a speaker to be filled, followed by equal proportion thermal compression, so that the size of the sound-absorbing member is the same as the predetermined size of the rear cavity of the speaker to be filled. The sound-absorbing members treated by cutting and compressing have a small dimensional tolerance and facilitate assembly with the predetermined rear cavity of the speaker to be filled. The cutting and compressing process effectively improves the dimensional accuracy of the sound-absorbing member. On the other hand, the cell uniformity and the cell diameter of the sound-absorbing member can be controlled by the compression process. The present invention is not limited to necessarily including cutting and compression processing in the method according to the present invention. The method according to the present invention can also directly foam a sound-absorbing member matched with the predetermined rear cavity size of the speaker by controlling the amount of sound-absorbing mixture and the space for foaming process. Those skilled in the art can select the foaming process and determine whether to adopt cutting and compressing process according to actual conditions.

In addition, in the preparation of sound-absorbing mixture, depending on the choice of non-foaming sound-absorbing material powder and foaming materials, auxiliaries and/or solvents need to be properly blended, so after the foaming process, the resulting sound-absorbing members may be sucked with liquid molecules. In order to increase the acoustic performance of the sound-absorbing member and prevent the liquid in the sound-absorbing member from affecting the speaker structure, the sound-absorbing member may be subjected to a drying and/or roasting treatment. Those skilled in the art can set the drying and roasting temperature and heating rate to achieve a good drying effect without damaging the structure of the sound-absorbing member.

The present invention also provides a sound-absorbing member, which can be prepared by the preparation method according to the present invention. The sound-absorbing member includes foam having cells. Non-foaming sound-absorbing material powder is uniformly attached to the cells and a surface of the foam. The non-foaming sound-absorbing material powder may be other aluminosilicate crystal powder such as molecular sieves, natural zeolite powder, silica and the like. One or a uniform mixture of the above-mentioned various materials can be used as non-foaming sound-absorbing material powder. The foam of the sound-absorbing member may also be formed by a foaming process of different foaming materials. Since the density and size of the foam formed by different foaming materials are different, the mass ratio of the non-foaming sound-absorbing material powder in the sound-absorbing member may also be different. For example, if foaming is performed using polyol DTI, the resulting foam is polyurethane foam. Polyurethane foam has a large cell diameter and a large number of cells, so the amount of non-foaming sound-absorbing material powder in the sound-absorbing member can be appropriately increased. Preferably, the mass ratio of the non-foaming sound-absorbing material powder in the sound-absorbing member is 25%-65%. Alternatively, a mixture of melamine powder and formaldehyde resin may also be used for foaming, and the resulting foam is melamine foam. Compared to polyurethane foam, melamine foam has a smaller cell diameter and a smaller number of cells, so the amount of non-foaming sound-absorbing material powder in the sound-absorbing member can be appropriately reduced.

Preferably, the mass ratio of the non-foaming sound-absorbing material powder in the sound-absorbing member is 15%-55%.

Although some specific embodiments of the present invention have been described in detail by way of example, it will be understood by those skilled in the art that the above examples are for illustrative purposes only and are not intended to limit the scope of the present invention. It should be understood by those skilled in the art that the above embodiments may be modified without departing from the scope and spirit of the present invention. The scope of the present invention is defined by the appended claims.

The invention claimed is:

1. A method for preparing a sound-absorbing member, comprising:
   providing non-foaming sound-absorbing material powder and a foaming material;
   uniformly mixing the non-foaming sound-absorbing material powder with the foaming material and adding an auxiliary to form a sound-absorbing mixture; and
   foaming the sound-absorbing mixture so that the foaming material forms foam with cells, wherein the non-foaming sound-absorbing material powder adheres to a surface and the cells of the foam, and the non-foaming sound-absorbing material powder and the foam constitute a sound-absorbing member,
   wherein the foaming material is polyol, and the foaming process is continuous application of high-pressure carbon dioxide gas to the sound-absorbing mixture, and the formed foam is polyurethane foam,
   wherein the non-foaming sound-absorbing material powder is molecular sieves, and the auxiliary comprises a humectant and a binder, and
   wherein the binder is inorganic silica sol, and the mass ratio of binder n the sound-absorbing mixture is 3%-3.5%.

2. The preparation method according to claim 1, wherein the mass ratio of the auxiliary in the sound-absorbing mixture is 0.02%-20%.

3. The preparation method according to claim 1, further comprising cutting and compressing the foam so that the size of the sound-absorbing member matches a predetermined size.

4. A sound-absorbing member prepared by the preparation method according to claim 1, the sound-absorbing member comprising foam, wherein cells are arranged in the foam, and the non-foaming sound-absorbing material powder is attached to the cells and a surface of the foam.

5. The sound-absorbing member according to claim 4, wherein the mass ratio of the non-foaming sound-absorbing material powder in the sound-absorbing member is 25%-65%.

* * * * *